United States Patent
Ayesh et al.

(10) Patent No.: US 10,988,132 B2
(45) Date of Patent: Apr. 27, 2021

(54) VEHICLE USER EXPERIENCE ENHANCEMENT

(71) Applicant: Ford Global Technologies, LLC, Dearborn, MI (US)

(72) Inventors: Hani Mohammad Ayesh, Canton, MI (US); Keith Weston, Canton, MI (US); Nolen Thomas Barnes, III, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 16/108,150

(22) Filed: Aug. 22, 2018

(65) Prior Publication Data

US 2020/0062237 A1 Feb. 27, 2020

(51) Int. Cl.
| | |
|---|---|
| *B60W 20/17* | (2016.01) |
| *B60W 10/22* | (2006.01) |
| *B60W 10/06* | (2006.01) |
| *B60R 11/02* | (2006.01) |
| *B60W 10/30* | (2006.01) |
| *B60W 50/00* | (2006.01) |

(52) U.S. Cl.
CPC ......... *B60W 20/17* (2016.01); *B60R 11/0247* (2013.01); *B60W 10/06* (2013.01); *B60W 10/22* (2013.01); *B60W 10/30* (2013.01); *B60W 50/0098* (2013.01)

(58) Field of Classification Search
CPC ....... B60W 20/17; B60W 10/22; B60W 10/30
See application file for complete search history.

(56) References Cited

U.S. PATENT DOCUMENTS

| 8,384,528 B2 | 2/2013 | McCarthy et al. | |
|---|---|---|---|
| 2004/0142672 A1* | 7/2004 | Stankewitz | G10L 21/0208 455/296 |
| 2005/0089177 A1* | 4/2005 | Hughes | H03G 3/32 381/86 |
| 2006/0173593 A1* | 8/2006 | Anderson | B60W 20/15 701/36 |
| 2009/0319160 A1* | 12/2009 | Callahan | F02D 41/1497 701/111 |
| 2010/0080399 A1* | 4/2010 | Pfau | B60N 2/56 381/71.4 |
| 2014/0228078 A1* | 8/2014 | Weber | G10K 11/175 455/569.2 |
| 2015/0249886 A1* | 9/2015 | Haylett | G10K 11/17857 381/71.4 |

(Continued)

OTHER PUBLICATIONS

Shaw, Kristin, Mustang GT Drivers Are Now Better Neighbors Thanks To New Quiet Start Mode, A Girls Guide to Cars, Aug. 2, 2017, 5 pgs.

*Primary Examiner* — Kira Nguyen
(74) *Attorney, Agent, or Firm* — Michael Spenner; Brooks Kusman PC (57) ABSTRACT

A vehicle comprises a processor programmed to: responsive to detecting a predefined event, transition a plurality of vehicle systems from a normal mode of operation to a quiet mode of operation, the transition including to adjust vehicle exhaust setting to a quiet mode, engage active noise cancellation, close vehicle windows, and adjust vehicle suspension to a predefined suspension mode.

19 Claims, 6 Drawing Sheets

(56) References Cited

U.S. PATENT DOCUMENTS

| | | | |
|---|---|---|---|
| 2015/0336568 A1* | 11/2015 | Porras | B60W 20/00 |
| | | | 701/22 |
| 2016/0012814 A1* | 1/2016 | Weber | G10K 11/178 |
| | | | 381/71.4 |
| 2016/0123210 A1* | 5/2016 | Dmytrow | F01N 13/087 |
| | | | 137/599.11 |
| 2016/0187992 A1* | 6/2016 | Yamamoto | G06K 9/00389 |
| | | | 345/156 |
| 2017/0096101 A1* | 4/2017 | Bailey, III | G10K 15/02 |
| 2017/0129298 A1* | 5/2017 | Lu | B60G 17/015 |
| 2017/0234691 A1* | 8/2017 | Abramson | G01C 21/3484 |
| | | | 701/442 |
| 2017/0345408 A1* | 11/2017 | Hong | H04R 25/50 |

\* cited by examiner

VEHICLE USER EXPERIENCE ENHANCEMENT

TECHNICAL FIELD

The present disclosure generally relates to a system for enhancing vehicle user experience. More specifically, the present disclosure relates to a system for enhancing vehicle user experience by adjusting vehicle features.

BACKGROUND

Many modern vehicles are provided with advanced features to enhance user/occupant experience. For instance, an active exhaust system may turn up the exhaust sound in a sport mode and turn down the volume in a quite mode. Similarly, an adaptive suspension may adjust the response of suspension between stiff configuration for better handling and soft configuration for ride comfort.

SUMMARY

In one or more illustrative embodiment, a vehicle comprises a processor programmed to responsive to detecting a predefined event, transition a plurality of vehicle systems from a normal mode of operation to a quiet mode of operation, the transition including to adjust vehicle exhaust setting to a quiet mode, engage active noise cancellation, close vehicle windows, and adjust vehicle suspension to a predefined suspension mode.

In one or more illustrative embodiment, a method for a vehicle comprises detecting a predefined event; and transitioning a plurality of vehicle systems from a normal mode of operation to a quiet mode of operation by adjusting vehicle exhaust setting to a quiet mode, engaging active noise cancellation, closing vehicle windows, and adjusting vehicle suspension to a predefined suspension mode.

In one or more illustrative embodiment, a vehicle comprises a processor programmed to responsive to detecting a conversation involving at least one vehicle user, transition a plurality of vehicle systems from a normal mode of operation to a quiet mode of operation, the transition including to adjust vehicle exhaust setting to a quiet mode, engage active noise cancellation, close vehicle windows, and switch vehicle sound enhancement to a conducive mode.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a vehicle user experience enhancement system. More specifically, the present disclosure proposes a system configured to automatically adjust vehicle features such as exhaust and/or suspension settings responsive to a vehicle event to enhance the vehicle user experience. The vehicle event may include a phone call, a conversation among vehicle users, a user gesture, an evasive driving condition, an emergency situation, and/or vehicle entering a specific location. Further aspects of the disclosure are discussed in detail herein.

Figure 1:
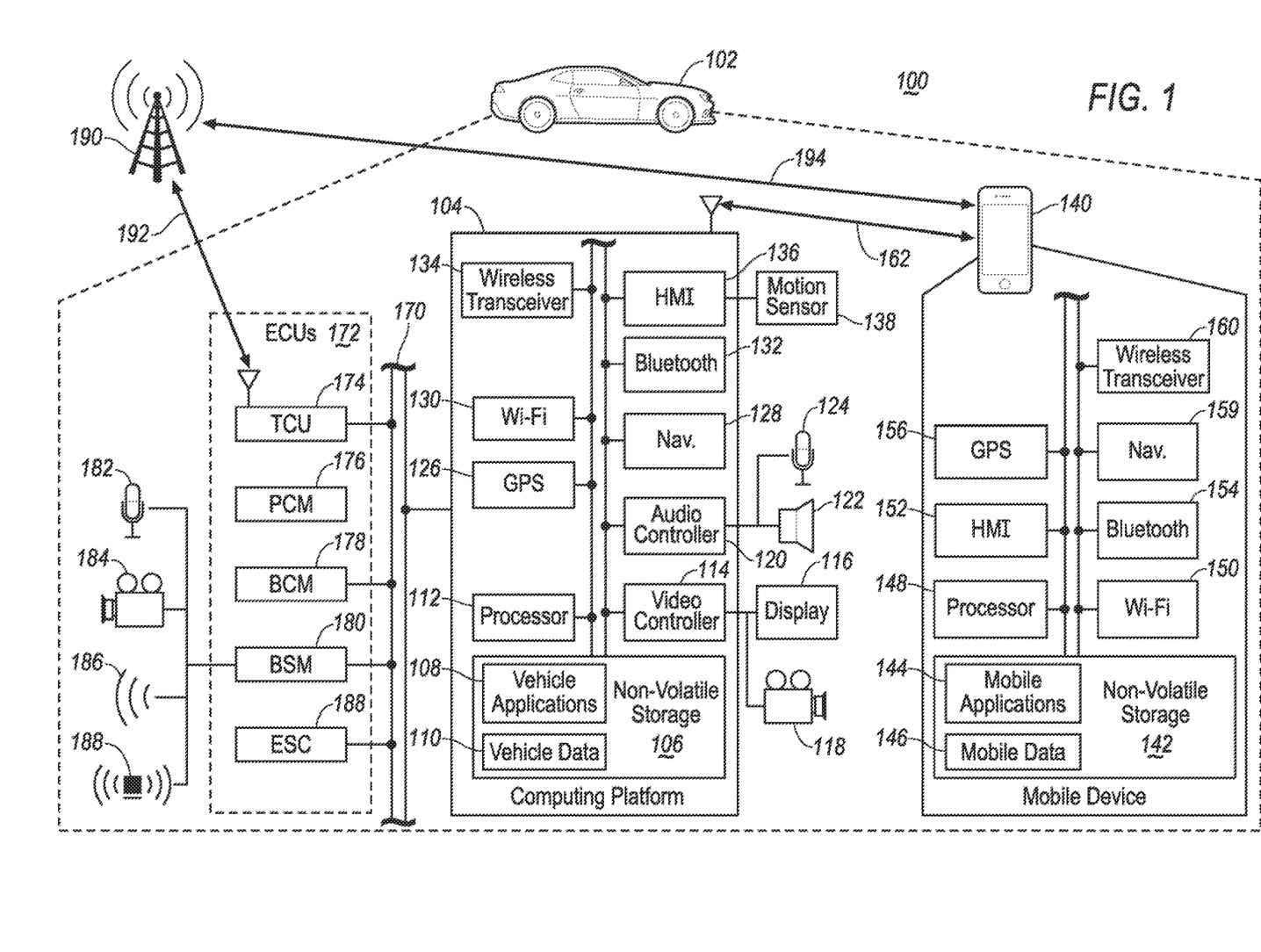
FIG. 1 illustrates an example block topology of a vehicle system of one embodiment of the present disclosure.

Referring to FIG. 1, an example block topology of a vehicle system 100 of one embodiment of the present disclosure is illustrated. Vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, satellite radio decoding, and vehicle setting adjustments. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 136 configured to provide for occupant interaction with the vehicle 102. As an example, the computing platform 104 may interface with one or more motion sensors 138, buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. The computing platform 104 may further drive or otherwise communicate with one or more cabin cameras 118 configured to provide visual input to the computing platform by way of the video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 and microphones 124 configured to provide audio output and input to and from vehicle occupants by way of an audio controller 120. The speaker 112 and microphone 124 may enable various features such as active noise cancellation and vehicle exhaust sound enhancement by the computing platform 104.

The computing platform 104 may also be provided with navigation and route planning features through a navigation controller 128 configured to calculate navigation routes responsive to user input via e.g. the HMI controls 136, and output planned routes and instructions via the speaker 122 and the display 116. Location data that is needed for navigation may be collected from a global positioning system (GPS) controller 126 configured to communicate with GPS satellites and calculate the location of the vehicle 102. Map data used for route planning may be stored in the storage 106 as a part of the vehicle data 110. Alternatively, map data may be live streamed from the cloud with or without being stored in the storage 106. Navigation software may be stored in the storage 116 as a part of the vehicle applications 108.

The computing platform 104 may be configured to communicate with a mobile device 140 of the vehicle occupants via a wireless connection 162. The mobile device 140 may be any of various types of portable computing device, such as cellular phones, tablet computers, smart watches, laptop computers, portable music players, or other device capable of communication with the computing platform 104. In many examples, the computing platform 104 may include a wireless transceiver 134 in communication with a WiFi controller 130, a Bluetooth controller 132, and other controllers such as a Zigbee transceiver, an IrDA transceiver, an RFID transceiver (not shown), configured to communicate with a compatible wireless transceiver 160 of the mobile device 140.

The mobile device 140 may be provided with communication capability via the wireless transceiver in communication with a WiFi controller 150, a Bluetooth controller 154 and other controllers configured to communicate with a compatible wireless transceiver 134 of the computing platform 104. The mobile device 140 may be further provided with capability to communicate with the wireless network 190 via a wireless connection 194.

The mobile device 140 may be provided with a processor 148 configured to perform instructions, commands, and other routines in support of the processes such as navigation, calling, wireless communication, and multi-media processing. For instance, the mobile device 140 may be provided with location and navigation functions via a navigation controller 158 and a GPS controller 156 controlled by application as a part of a mobile application 144 stored in a non-volatile storage 142. Map data used for navigation purposes may be stored in the storage 142 as a part of mobile data 146. Alternatively, the mobile device 140 may be configured to download live map and traffic data from a remote server via a communication network 190 through a wireless connection 194. For instance, the communication network 190 may be a cellular network. The mobile device 140 may be provided with various features allowing the vehicle occupants/users to interface with the mobile device 140. For example, the mobile device 140 may receive input from human-machine interface (HMI) controls 152 configured to provide for occupant interaction with the mobile device 140 as well as the vehicle 102.

The computing platform 104 may be further configured to communicate with various electronic control units (ECUs) via one or more in-vehicle network 170. The in-vehicle network 170 may include, but is not limited to, one or more of a controller area network (CAN), an Ethernet network, and a media oriented system transport (MOST), as some examples.

The vehicle 102 may include multiple ECUs 172 configured to control and operate various functions of the vehicle 102. As a few non-limiting examples, the ECUs 172 may include a telematics control unit (TCU) 174 configured to control telecommunications of the vehicles 102. In many cases, the TCU 174 may include a modem (not shown) configured to communicate between the vehicle 102 and the communication network 190. The ECUs 172 may further include a powertrain control module (PCM) 176 configured to control the powertrain of the vehicle 102 such as engine tuning and exhaust mode; and a body control module (BCM) 178 configured to operate various exterior and interior body functions of the vehicle 102 such as doors, windows and suspension modes.

The ECUs 172 may further include a body sensor module (BSM) configured to control and operate various sensors of the vehicle 102. For instance, the BSM 180 may drive or otherwise communicate with one or more exterior microphones 184, camera 184, and radar 186 configured to provide audio, video and proximity input to the BSM 180 as well as the computing platform 104. BSM 180 may further drive or otherwise communicate with one or more beacons 188 configured to enable the vehicle 102 to communicate with other vehicles. As an example, the beacon 188 may support dedicated short range communication (DSRC) technology to enable direct communication between multiple vehicles. The ECUs 172 may further include electronic stability controls (ESC) 188 configured to monitor the operation of the vehicle 102 and controls safety features such as anti-lock brakes (ABS) and traction controls.

Figure 2:
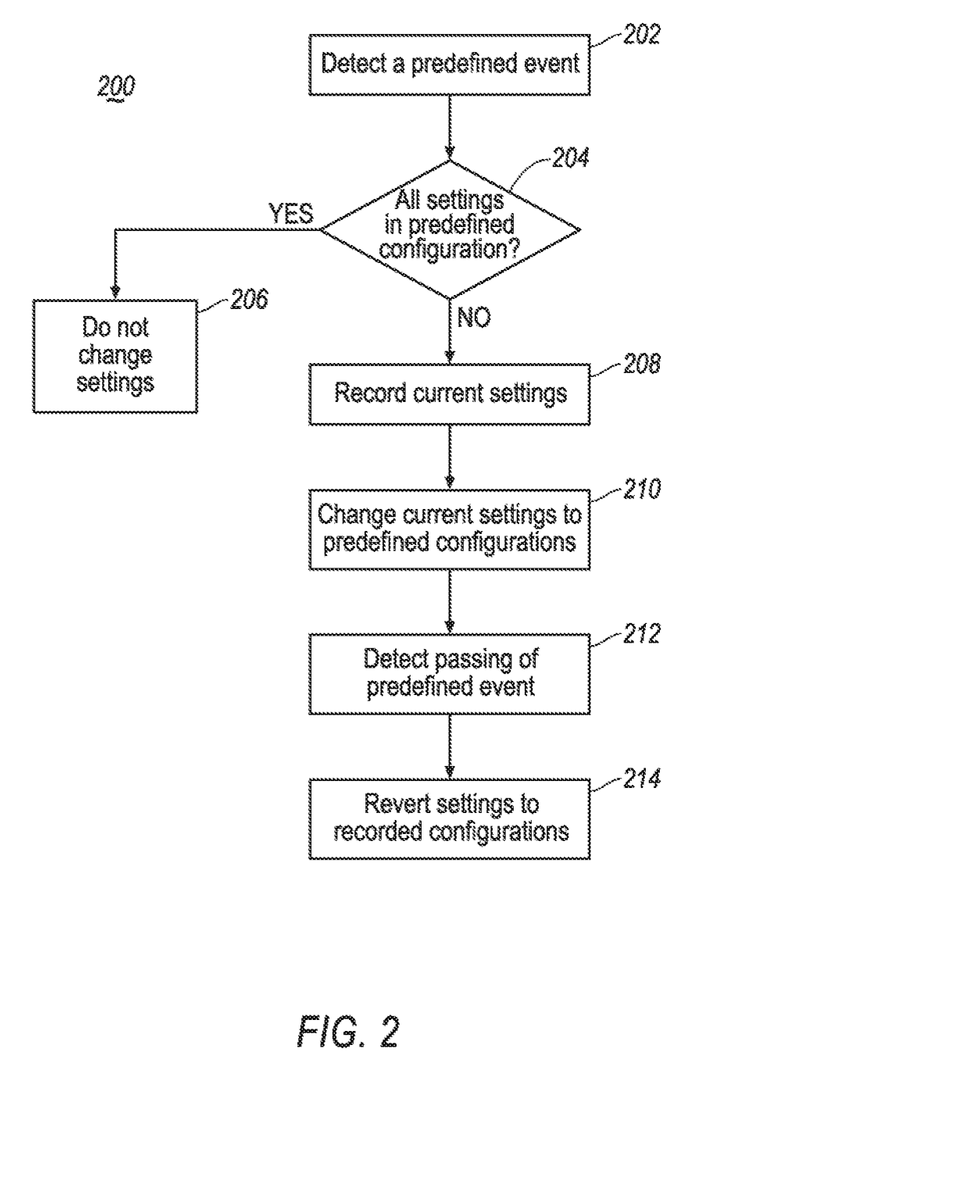
FIG. 2 illustrates an example flow diagram for a process of a general embodiment of the present disclosure.

Referring to FIG. 2, a flow diagram for a process 200 of a general embodiment of the present disclosure is illustrated. At operation 202, computing platform 104 detects a predefined event. A few non-limiting examples of the predefined event may include an incoming/outgoing phone call; a conversation between vehicle occupants; a user gesture demanding quietness; an evasive driving situation; horns or sirens of outside vehicles; an outside image or sound; and/or a location detected by various sensors and inputs in communication with the computing platform 104.

At operation 204, the computing platform 104 checks whether all predefined vehicle settings are in predefined preference for the specific event detected at operation 202. Vehicle settings may include vehicle exhaust mode; exhaust sound enhancement; active noise cancellation; suspension mode; windows setting; and/or convertible top (for convertible vehicles). Each setting may have a predefined preference for a specific event. For instance, in an event of an incoming phone call, the predefined configuration for the exhaust mode may be a quite mode for enhanced user experience. If at operation 204, the computing platform all predefined vehicle settings are in predefined configurations, the process proceeds to operation 206 and no setting is changed. Otherwise, the process proceeds to operation 208, and the computing platform 104 records current status/configuration for all settings for restoration purposes which will be discussed below. The recorded status/configuration may be stored in the storage 106 as a part of vehicle data 110. Alternatively, the recorded status/configuration may be stored in ECU corresponding to the particular feature setting. In case that some settings are in predefined preference and some others are not, the computing platform 104 may only record those settings that are not in predefined preference.

At operation 210, the computing platform 104 changes settings from current configurations to predefined configurations. Taking the above incoming phone call situation for instance, the computing platform 104 may switch the exhaust to the quietest mode, turn on active noise cancellation and switch the suspension to the most comfortable settings through various components and ECUs of the vehicle 102 to provide the best user experience for a phone call.

At operation 212, the computing platform 104 detects the predefined event has passed and the process proceeds to operation 214 and the computing platform 104 restores settings to the previously recorded configurations loading the configurations from the storage 106. Still using the above phone call example, the computing platform 104 may detect the phone call has ended and load the configurations previously stored in the storage at operation 208 to restore the exhaust mode, active noise cancellation and suspension to the previously configurations prior to receiving the incoming phone call.

Figure 3A:
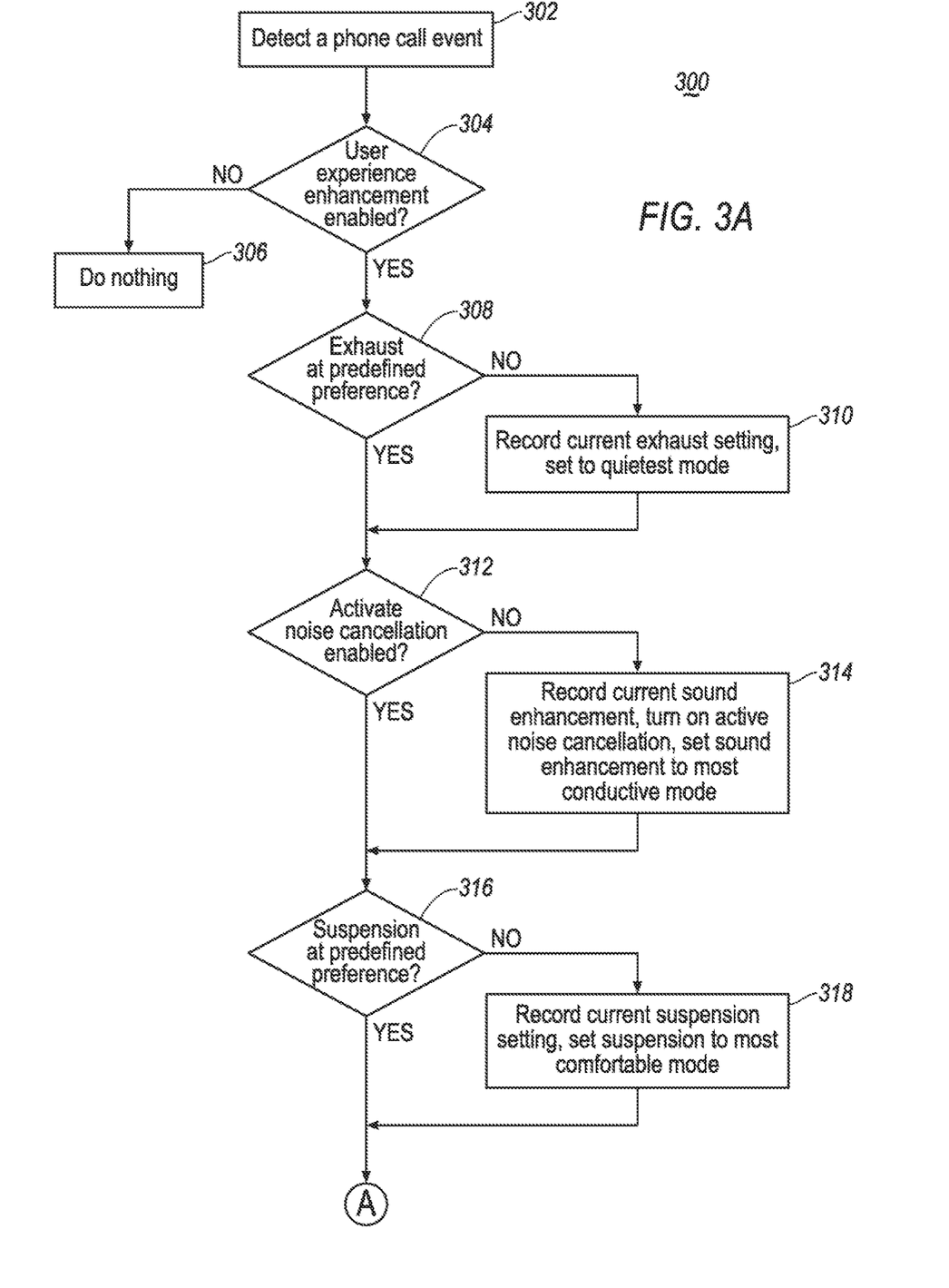
FIGS. 3A and 3B illustrate an example flow diagram for a process of a phone call event embodiment of the present disclosure.
Figure 3B:
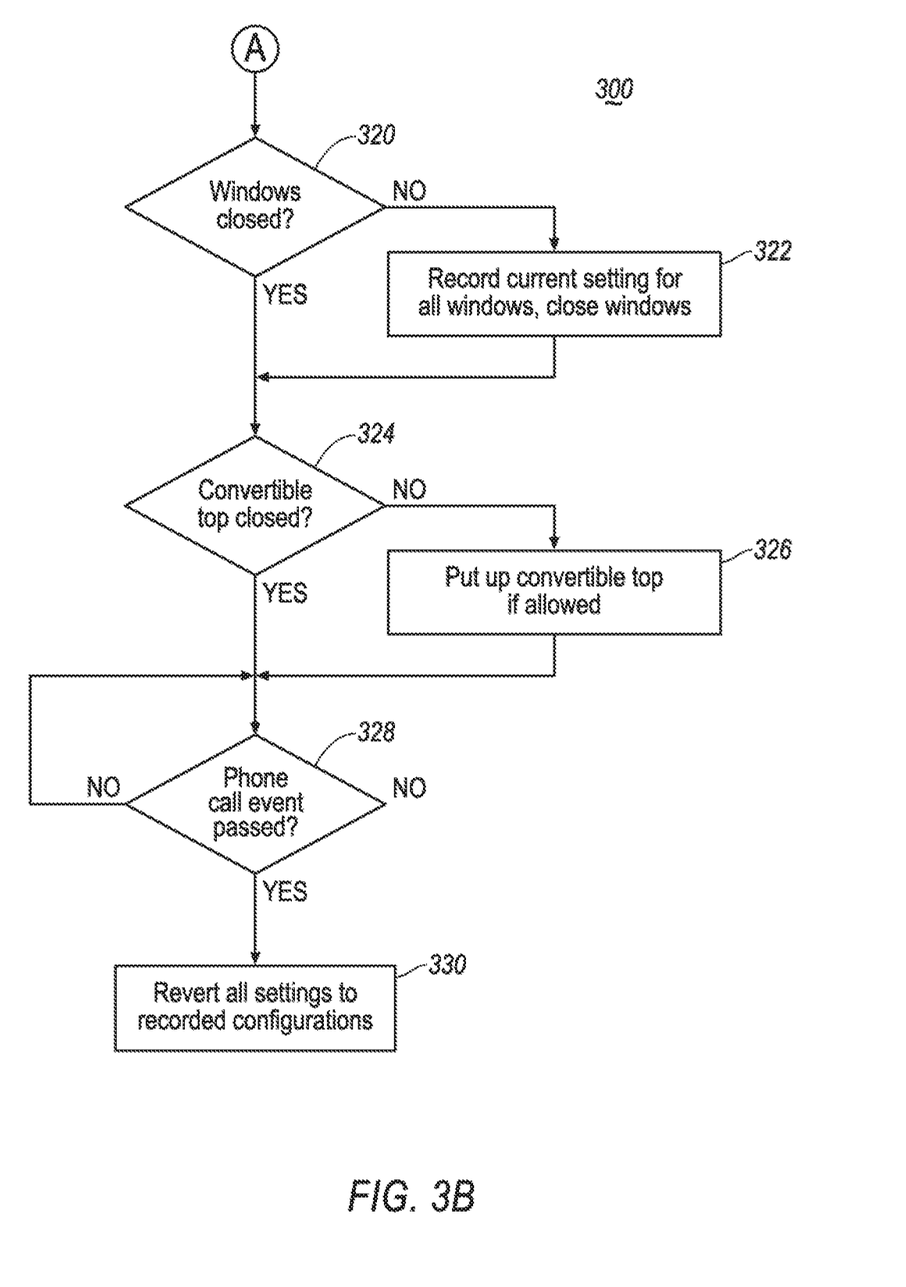

The operations of process 200 may be applied to various situations. Referring to FIG. 3, a flow diagram for a process 300 of a phone call embodiment of the present disclosure is illustrated. At operation 302, the computing platform 104 detects a phone call event while the vehicle 102 is being operated by a user. The phone call event may include an incoming or outgoing call by the mobile device 140 connected to the computing platform 104 via the wireless connection 162 using the Bluetooth controller 132 or other technologies. Alternatively, the phone call event may be initiated via the TCU 174 of the vehicle 102 without the mobile device 140.

Responsive to detecting the phone call event, at operation 304, the computing platform 104 determines whether the user experience enhancement feature is enabled. If the answer is a no, the process proceeds to operation 306 and no further action is performed. Otherwise, if the user experience enhancement feature is enabled, the process proceeds to operation 308 and the computing platform 104 determines whether the exhaust setting is at the predefined preference for phone calls. For instance, a predefined preference may be the quietest exhaust mode for the best phone call experience. If the computing platform 104 determines the current exhaust setting is not at the predefined preference, the process proceeds to operation 310 and the computing platform 104 set the exhaust to the preference setting after recording the current setting. The current exhaust setting may be recorded and stored in the storage 106 as a part of vehicle date 110 for further restoration purposes.

The computing platform 104 further checks whether the active noise cancellation is enabled at operation 312. The active noise cancellation setting is correlated with vehicle sound enhancement sometimes. If the computing platform 104 determines that the active noise cancellation is not enabled, the process proceeds to operation 314 and the computing platform 104 turns on the active noise cancellation feature of the vehicle 102. In addition, in case that the sound enhancement feature is available, the computing platform 104 may further records the current sound enhancement setting in the storage 106 and set to the most conducive mode if that is not the current case.

The computing platform 104 further checks whether the suspension setting is at the predefined preference at operation 316. If that is not the case, the process proceeds to operation 318 and the computing platform 318 sets the suspension to the most comfortable mode which is the predefined preference after recording the current suspension setting.

The computing platform 104 further checks whether all windows (including the sun/moon roof if available) of the vehicle 102 are closed via the BCM 178 at operation 320. If not all windows are closed, the process proceeds to operation 322. The computing platform 104 records the current setting/status for all windows and close all windows for optimized phone call user experience.

In case that the vehicle 102 is convertible, the computing platform 104 further checks whether the convertible top is closed at operation 324. If not, the computing platform 104 puts up the convertible top via the BCM 178 if the conditions allow. For instance, the convertible top may be closed if the vehicle 102 is operating within the speed limit allowing to close the top safely.

Depending on specific configurations of the vehicle 102, more or less settings may be adjusted. At operation 328, if the computing platform 104 determines that the phone call event has passed, the process proceeds to operation 330 and the computing platform 104 loads the recorded settings from the storage 106 to restore to the previous settings before the detection of the phone call event. The passing of the phone call event may be determined by the user hanging up the phone. Additionally or alternatively, a grace time period (e.g. 10 seconds after the hang up) may be used to confirm that the user is not making another phone call.

The operations of process 200 may be further applied to other situations such as a conversation between vehicle users. The computing platform 104 may be configured to enhance user experience responsive to detecting a conversation between the vehicle users via the microphone 124 by way of the audio controller 120. Additionally or alternatively, the computing platform 104 may detect conversations between vehicle users using the mobile device 140 connected via the wireless connection 162. Responsive to detecting the conversation, the computing platform may perform operations similar to process 300 to enhance the user conversation experience. For instance, the computing platform 104 may be configured to perform operations including set the exhaust to the quietest mode, turn on active noise cancellation, set sound enhancement to the most conducive mode, set suspensions to the most comfortable mode, close windows and/or put up convertible top. Responsive to the passing of the conversation, the computing platform 104 may revert all settings to previously recorded configurations. Similar to the phone call event example, a grace time period may be used to determine the passing of the conversation.

Figure 4:
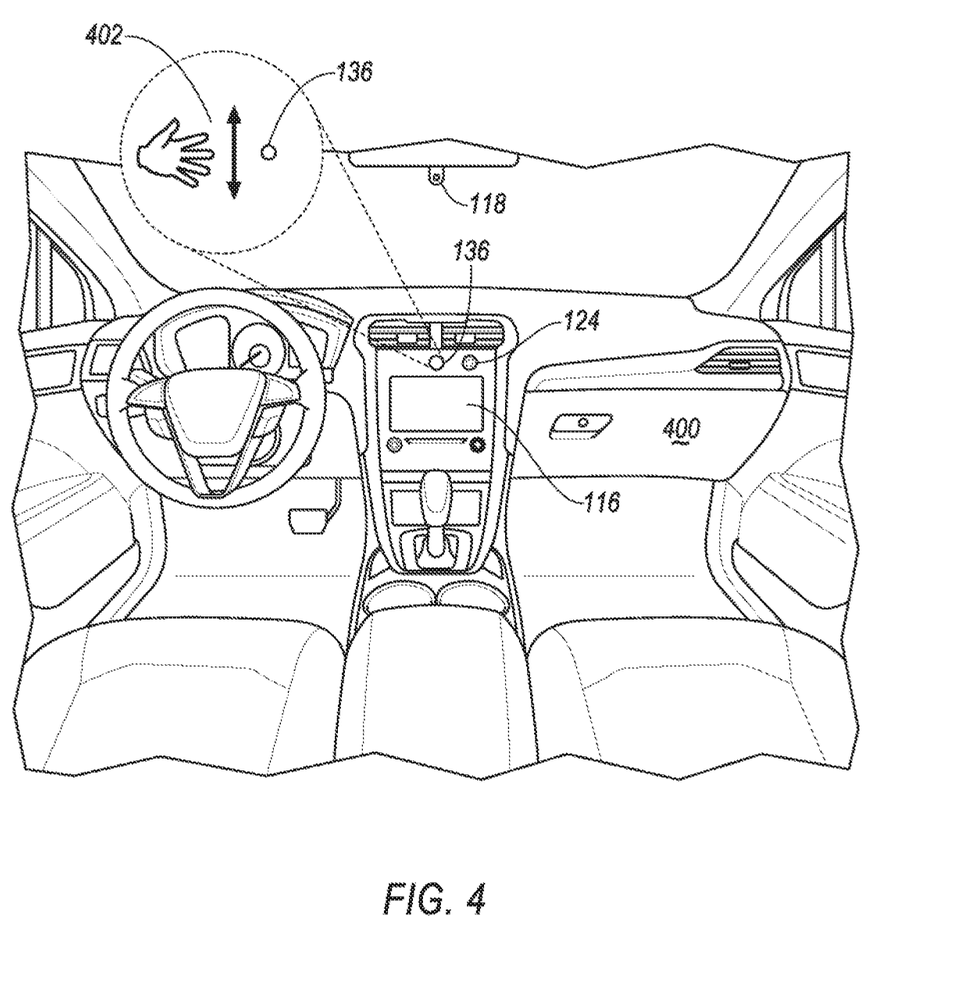
FIG. 4 illustrates an example vehicle cabin view of the present disclosure.

The operations of process 200 may be further applied to other situations such as detecting a gesture or motion made by a vehicle user instructing to enter quiet mode. The computing platform 104 may be configured to set the vehicle 102 to a preconfigured mode (e.g. quiet mode) responsive to detecting a user gesture or motion input via the motion sensor 138 or the cabin camera 118. Referring to FIG. 4, an example vehicle dashboard diagram 400 of the present disclosure is illustrated. Among other things, the motion sensor 138 is provided near the infotainment display 116 above the center console of the vehicle 102. Additionally, the cabin camera 118 may be provided near the rear-view mirror facing inward to capture images of the vehicle cabin. It is noted that the locations of the motion sensor 136 and the cabin camera 118 are merely examples and other appropriated locations may be used. The computing platform 104 may be configured to detect a hand gesture or motion 402 made by the vehicle user to trigger the process 200. As illustrated in FIG. 4, the hand gesture or motion 402 may be an up and down motion previously configured into the computing platform 104. For instance, a downward hand motion may indicate quiet mode and an upward hand motion may indicate restore from quiet mode to previously mode. Additionally or alternatively, the computing platform 104 may detect the user gesture or motion 402 using the cabin camera 118 with image processing software stored in the storage 106 as a part of vehicle applications 108. Responsive to detecting the user gesture or motion 402 indicating quiet mode, the computing platform may perform the process similar to operations 308-326 to adjust the vehicle into a quiet mode to enhance user experience. To terminate the quiet mode, the vehicle user may perform a preconfigured gesture 402, and the computing platform may restore the vehicle settings to the previous configuration in response. Alternatively, the trigger and restore feature of the computing platform 104 may be performed by voice commands using the microphone 124 by way of the audio controller 120 in addition to or instead of the gesture or motion detection.

Figure 5:
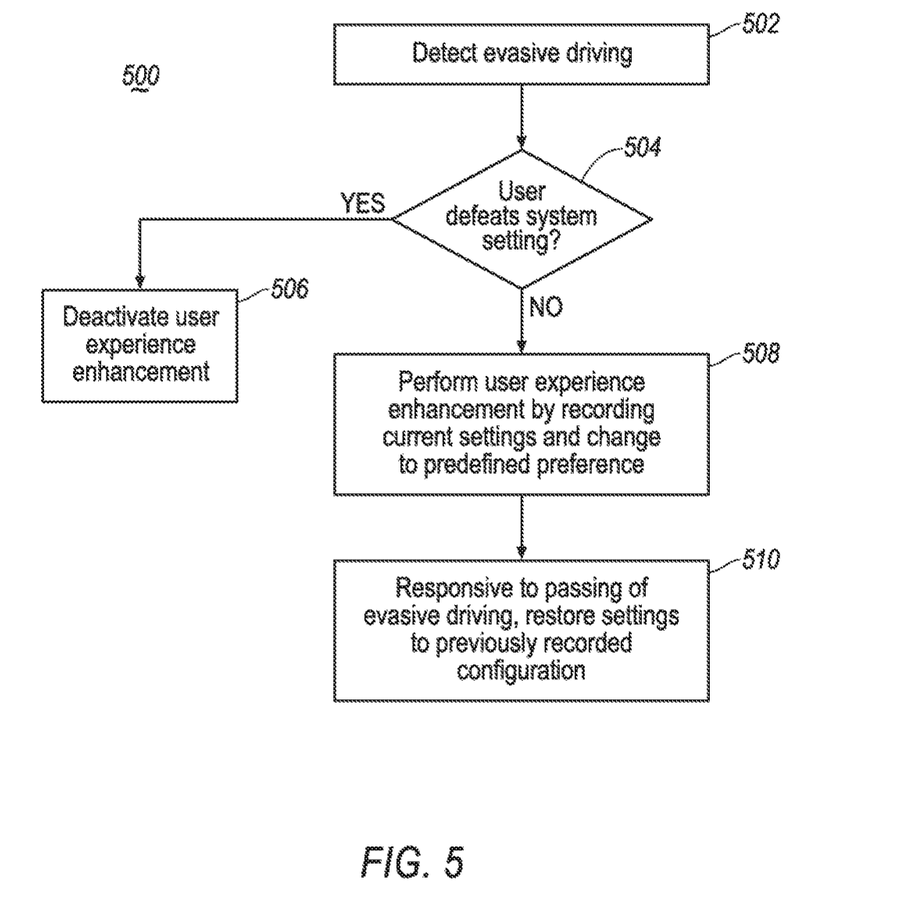
FIG. 5 illustrates an example flow diagram for a evasive driving embodiment of the present disclosure.

The operations of process 200 may be further applied to other situations such as evasive driving. Referring to FIG. 5, a flow diagram for process 500 of the evasive driving embodiment of the present disclosure is illustrated. At operation 502, the computing platform 104 detects an evasive driving event via the ESC 188 connected via the in-vehicle network 170. For instance, the evasive driving may be detected via ESC 188 through evasive operations including engaging traction controls, antilock brakes, and/or stability controls.

Responsive to detecting the evasive driving, the computing platform 104 verifies whether the user is intentionally doing some special driving such as race track or autocross and has manually defeated the user experience enhancement settings at operation 506. If that is the case, the process proceeds to operation 506, and the computing platform 104 deactivates the user experience enhancement system and allows the user to continue the special driving. However, if the answer for operation 504 is a no, the process proceeds to operation 508 and the computing platform 104 performs user experience enhancement by recording current settings and change the settings to predefined preference. This operation is similar to operations 308-326 illustrated in FIG. 3, with a few differences. Instead of turning all setting to the quietest and comfortable mode, in this case, more concentration and control is desired to improve the user's chance to safely maneuver the vehicle 102. For instance, the computing platform 104 may set the exhaust to the quietest mode, set active noise cancellation and sound enhancement to the most conducive mode helping the user concentrate, set the suspensions to the most controlled settings (e.g. firmest suspension setting), close all windows and put up convertible top (if applicable).

At operation 510, responsive to detecting the evasive driving has passed, the computing platform 104 reverts settings to previously recorded configuration. Similarly, a time period may be used to determine the evasive driving has passed. For instance, the computing platform 104 may determine the evasive driving condition has passed 30 seconds after disengaging traction control or ABS by the ESC.

The operations of process 200 may be further applied to emergencies which may include various situations. For instance, the emergency situation may include emergency vehicles are nearby by detecting flash light and/or siren using the exterior camera 184 and/or microphone by way of the BSM 180. The computing platform may further detect the emergency vehicle using the beacon 188. For instance, the computing platform 104 may detect flash light from an emergency behind or near the vehicle 102, indicating the vehicle 102 should stop or yield. In response, the computing platform 104 may perform operations similar to operation 508 in FIG. 5 and adjust the vehicle 102 to help the user concentrate. After the emergency vehicle has passed, the computing platform 104 may revert to the previous configuration.

In addition, the emergency situation may further include detecting objects including human and animals using various sensors managed by the BSM 180. For instance, the computing platform 104 may detect the vehicle 102 is approaching an animal (e.g. a deer) at high speed via the radar 186, the camera 184 and/or the microphone 182, and enable the user experience enhancement feature to help the user concentrate similar to the emergency vehicle case.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising a processor, programmed to:
responsive to detecting a predefined event, transition a plurality of vehicle systems from a normal mode of operation to a quiet mode of operation, the transition including to adjust vehicle exhaust setting to a quiet mode, engage active noise cancellation, close vehicle windows, and adjust vehicle suspension to a predefined suspension mode, wherein the predefined event includes a conversation within a vehicle cabin detected via a mobile device wirelessly connected to the vehicle.

2. The vehicle of claim 1, wherein the predefined suspension mode is a compliant suspension mode.

3. The vehicle of claim 2, wherein the predefined event includes detection of a phone call, and the processor is further programmed to detect the phone call originated or destined to at least one of: a telematics control unit (TCU) of the vehicle, or a mobile phone in communication with the processor of the vehicle.

4. The vehicle of claim 2, wherein the predefined event includes detection of a gesture, and the processor is further programmed to detect the gesture via at least one of: a motion sensor, or an in-cabin camera.

5. The vehicle of claim 1, wherein and the processor is further programmed to detect the conversation via a microphone included within the cabin.

6. The vehicle of claim 1, wherein the predefined suspension mode is a controlled suspension mode.

7. The vehicle of claim 6, wherein the predefined event includes detection of an evasive driving, and the processor is further programmed to detect the evasive driving via electronic stability controls (ESC) engaging at least one of: anti-lock brakes (ABS), traction controls, or stability controls.

8. The vehicle of claim 6, wherein the predefined event includes detection of an emergency, and the processor is further programmed to detect the emergency via at least one of: an exterior camera, an exterior microphone, a radar, or a beacon.

9. The vehicle of claim 8, wherein the processor is further programmed to detect light emanating from an emergency vehicle via the exterior camera.

10. The vehicle of claim 8, wherein the processor is further programmed to detect sound emanating from an emergency vehicle via the exterior microphone.

11. The vehicle of claim 6, wherein the predefined event includes detection of an object, and the processor is further programmed to detect the object via a radar.

12. The vehicle of claim 1, wherein the processor is further programmed to:

record a status of settings of the plurality of vehicle systems in the normal mode before adjusting to the quiet mode; and restore the vehicle settings to the recorded status to return operation to the normal mode responsive to determining a conclusion of the predefined event.

13. The vehicle of claim 12, wherein a grace time period is used to determine the conclusion of the predefined event.

14. The vehicle of claim 1, wherein the transition a plurality of vehicle systems from a normal mode of operation to a quiet mode of operation further includes to put up a convertible top of the vehicle.

15. A method for a vehicle, comprising:

detecting a predefined event, wherein the predefined event includes detecting a phone call originated or destined to a mobile phone in communication with the vehicle via a wireless connection; and transitioning a plurality of vehicle systems from a normal mode of operation to a quiet mode of operation by
adjusting vehicle exhaust setting to a quiet mode,
engaging active noise cancellation,
closing vehicle windows, and
adjusting vehicle suspension to a predefined suspension mode.

16. The method of claim 15, wherein the predefined event includes detecting a conversation within a cabin of the vehicle via at least one of: a microphone included within the cabin, or a microphone of a mobile device in communication with the vehicle.

17. The method of claim 15, wherein the predefined event includes detecting light emanating from an emergency vehicle via an exterior camera; and detecting sound emanating from the emergency vehicle via an exterior microphone.

18. The method of claim 15, wherein the predefined event includes detecting an animal via an exterior sensor; and detecting sound from the animal via an exterior microphone.

19. A vehicle, comprising a processor, programmed to, responsive to detecting a conversation involving at least one vehicle user, transition a plurality of vehicle systems from a normal mode of operation to a quiet mode of operation, the transition including to adjust vehicle exhaust setting to a quiet mode, engage active noise cancellation, close vehicle windows, and switch vehicle sound enhancement to a conducive mode.

* * * * *